US010783568B1

(12) United States Patent
Chandra et al.

(10) Patent No.: US 10,783,568 B1
(45) Date of Patent: Sep. 22, 2020

(54) SOCIAL MERCHANDISING SYSTEM (71) Applicant: Poshmark, Inc., Menlo Park, CA (US)

(72) Inventors: Manish Chandra, Fremont, CA (US);
Gautam Golwala, Sunnyvale, CA (US);
Tracy Sun, San Francisco, CA (US)

(73) Assignee: Poshmark, Inc., Redwood City, CA (US)

( * ) Notice: Subject to any disclaimer, the term of this patent is extended or adjusted under 35 U.S.C. 154(b) by 654 days.

(21) Appl. No.: 14/945,130

(22) Filed: Nov. 18, 2015

Related U.S. Application Data

(62) Division of application No. 14/217,267, filed on Mar. 17, 2014, now abandoned.

(60) Provisional application No. 61/794,474, filed on Mar. 15, 2013.

(51) Int. Cl.
*G06Q 30/00* (2012.01)
*G06Q 30/06* (2012.01)
*G06Q 50/00* (2012.01)

(52) U.S. Cl.
CPC ......... *G06Q 30/0631* (2013.01); *G06Q 50/01* (2013.01)

(58) Field of Classification Search
CPC ..... G06Q 30/06; G06Q 30/0601–0641; G06Q 30/0619; G06Q 30/0361; G06Q 30/064; G06F 16/9535; G06F 16/9536
See application file for complete search history.

(56) References Cited

U.S. PATENT DOCUMENTS

| 7,099,933 | B1 | 8/2006 | Wallace et al. |
| 7,725,366 | B1 | 5/2010 | Franco |
| 7,818,392 | B1* | 10/2010 | Martino ................. G06Q 10/10 709/200 |
| 7,848,961 | B2 | 12/2010 | Estes et al. |
| 9,786,001 | B2* | 10/2017 | Abraham ................ G06Q 50/01 |
| 2002/0007292 | A1 | 1/2002 | Paxton et al. |
| 2002/0032612 | A1 | 3/2002 | Williams et al. |
| 2002/0046157 | A1 | 4/2002 | Solomon |
| 2002/0053029 | A1 | 5/2002 | Nakamura et al. |
| 2002/0087465 | A1 | 7/2002 | Ganesan et al. |
| 2003/0158791 | A1 | 8/2003 | Gilberto et al. |

(Continued)

OTHER PUBLICATIONS

"Guy, Ido, 'Social Media Recommendation based on People and Tags', Jul. 19-23, 2019, SIGIR'10, PDF pp. 1-8, Publication pp. 194-200" (Year: 2010).*

(Continued)

*Primary Examiner* — William J Allen
*Assistant Examiner* — Maria S. P. Heath
(74) *Attorney, Agent, or Firm* — Patent Law Works LLP (57) ABSTRACT

Users are matched to items and recommended friends in a social merchandising system. During registration, a user profile is created for a user among a plurality of users in the peer-to-peer marketplace. To calculate a compatibility score, a social genome is determined for the user based on social networking characteristics associated with the user. Also, a merchandise genome is determined for the user based on item characteristics associated with the user. Results are organized into a feed for the user based on the compatibility score and time. Feeds display items of friends, or as influenced by social connections and interactions.

20 Claims, 8 Drawing Sheets

(56) References Cited

U.S. PATENT DOCUMENTS

| | | | |
|---|---|---|---|
| 2006/0282304 A1* | 12/2006 | Bedard | G06F 17/30867 705/7.33 |
| 2007/0095904 A1 | 5/2007 | Barta et al. | |
| 2007/0214249 A1 | 9/2007 | Ahmed et al. | |
| 2008/0059329 A1 | 3/2008 | Luchene et al. | |
| 2008/0133612 A1 | 6/2008 | Liu et al. | |
| 2008/0255942 A1 | 10/2008 | Craft | |
| 2009/0157479 A1 | 6/2009 | Caldwell et al. | |
| 2009/0164333 A1 | 6/2009 | Rothman | |
| 2009/0254971 A1 | 10/2009 | Herz et al. | |
| 2009/0265255 A1 | 10/2009 | Jackson et al. | |
| 2009/0282125 A1 | 11/2009 | Jeide et al. | |
| 2010/0169163 A1 | 7/2010 | Alvin | |
| 2010/0205541 A1 | 8/2010 | Rapaport et al. | |
| 2011/0087731 A1 | 4/2011 | Wong et al. | |
| 2012/0209970 A1* | 8/2012 | Scipioni | G06Q 30/06 709/223 |
| 2012/0284145 A1* | 11/2012 | Kalin | G06Q 30/0631 705/26.7 |
| 2013/0030879 A1 | 1/2013 | Munjal | |
| 2013/0073473 A1 | 3/2013 | Heath | |
| 2013/0090998 A1 | 4/2013 | Shimogori | |
| 2013/0246146 A1* | 9/2013 | Fischer | G06Q 30/0222 705/14.23 |
| 2014/0046794 A1 | 2/2014 | Vallery et al. | |
| 2014/0108149 A1 | 4/2014 | Jabara et al. | |
| 2014/0129390 A1 | 5/2014 | Mauge et al. | |
| 2014/0136432 A1* | 5/2014 | Fallows | G06Q 30/0282 705/319 |
| 2014/0207611 A1 | 7/2014 | Cleary et al. | |
| 2014/0279049 A1 | 9/2014 | Wiseman et al. | |
| 2015/0012332 A1 | 1/2015 | Papachristos | |
| 2015/0134540 A1 | 5/2015 | Law et al. | |
| 2015/0219610 A1 | 8/2015 | Jackson, Jr. et al. | |
| 2015/0310569 A1 | 10/2015 | Chong et al. | |

OTHER PUBLICATIONS

"Che, Jilin, 'Personalized Recommendation in Social Network Sites', Sep. 2011, ProQuest, PDF pp. 14, 19, 42-47" (Year: 2011).*

Montgomery, Alan L., et al. "Modeling online browsing and path analysis using clickstream data" Marketing science 23.4 (2004): 579-595.

* cited by examiner

SOCIAL MERCHANDISING SYSTEM

CROSS-REFERENCES TO RELATED APPLICATIONS

This application is a divisional and claims the benefit of U.S. application Ser. No. 14/217,267, filed Mar. 17, 2014, entitled Social Merchandising System, which in turn claims the benefit of priority under 35 U.S.C. 119(e) to U.S. Application No. 61/794,474, filed Mar. 15, 2013, entitled Social Merchandising System, the contents of which are hereby incorporated herein by reference. This application is related to co-pending U.S. application Ser. No. 14/216,961 entitled Real-time User Generated Virtual Shopping Parties, having common inventors, the same assignee, and the same filing date as this application, the contents of which are hereby incorporated herein by reference. This application is also related to co-pending U.S. application Ser. No. 14/217,255 entitled Using Digital Item Tracking to Drive E-Commerce, having common inventors, the same assignee, and the same filing date as this application, the contents of which are hereby incorporated herein by reference.

TECHNICAL FIELD

This disclosure pertains generally to computerized social merchandising, and more specifically, to social merchandising in the context of peer-to-peer electronic marketplaces.

BACKGROUND

E-commerce through online marketplaces is thriving. When making a purchase online, several supporting vendors contribute to the transaction, such as a warehouse storing physical items for sale, a payment processor to collect and distribute funds, and a transporter for delivery of items. These entities often operate external to and independently of a marketplace, resulting in isolated processes and distributed information adhering to varying formats.

Peer-to-peer marketplaces are a segment of e-commerce in which nearly any individual with access to a networked computing device can become a seller in addition to a buyer, even for selling a single item. However, it is difficult for users to identify relevant items amongst the vast diversity of different sellers and items.

Conventional systems require input by users. Search terms query a database of products and return a results page of merchandise. Merchandise recommendation systems available from online shopping entities consider products primarily from the prism of the shopper by using shopping history, or to other shoppers, by using general shopping patterns (e.g., recommending products based on purchases by other shoppers viewing similar products). However, these recommendations are based strictly on cold, objective metrics without any consideration for social networking interactions between shoppers.

What is needed is a social merchandising technique that uses social affinity and merchandise affinity to generate an individualized feed for users on a peer-to-peer marketplace.

SUMMARY

The present invention addresses the shortcomings of the prior art by providing methods, computer readable mediums, and computing devices for social merchandising using social affinity and merchandise affinity to generate an individualized feed for users on a peer-to-peer marketplace.

In one embodiment, a user profile is created for a user among a plurality of users in the peer-to-peer marketplace. To calculate a compatibility score, a social genome is determined for the user based on social networking characteristics associated with the user. Also, a merchandise genome is determined for the user based on item characteristics associated with the user.

In yet another embodiment, results are organized into a scrolling feed for the user based on the compatibility score and other factors, such as time. Items with a higher compatibility score appear earlier in the feed. But depending on the weight of time as a factor, more recent items with lower compatibility scores can eventually appear higher in the feed than an older item with a higher compatibility score. Some feeds can display items of friends, or display items based on more tenuous social connections or social network interactions.

Advantageously, the techniques herein allow scalable discovery of products in a user generated e-commerce platform.

DETAILED DESCRIPTION

Methods, computer readable mediums (non-transitory), and computing devices for social merchandising using social affinity and merchandise affinity to generate an individualized feed for users on a peer-to-peer marketplace, are described.

The social merchandising techniques herein provide a new way of showcasing products or items (e.g., physical products, digital products, and services) for each member of a peer-to-peer marketplace. Members are provided a customized set of products based on a set of social connections that are formed between this member and other members in the marketplace. Social connections can be explicitly established links (e.g., User A follows User B), links based on spatiotemporal proximity (e.g., User A and User B are attending the same real time virtual shopping party), or inferred links (e.g., the system automatically determines the strength of virtual links between users or between users and items based on various characteristics). Compatible social connections can also be suggested.

Figure 1:
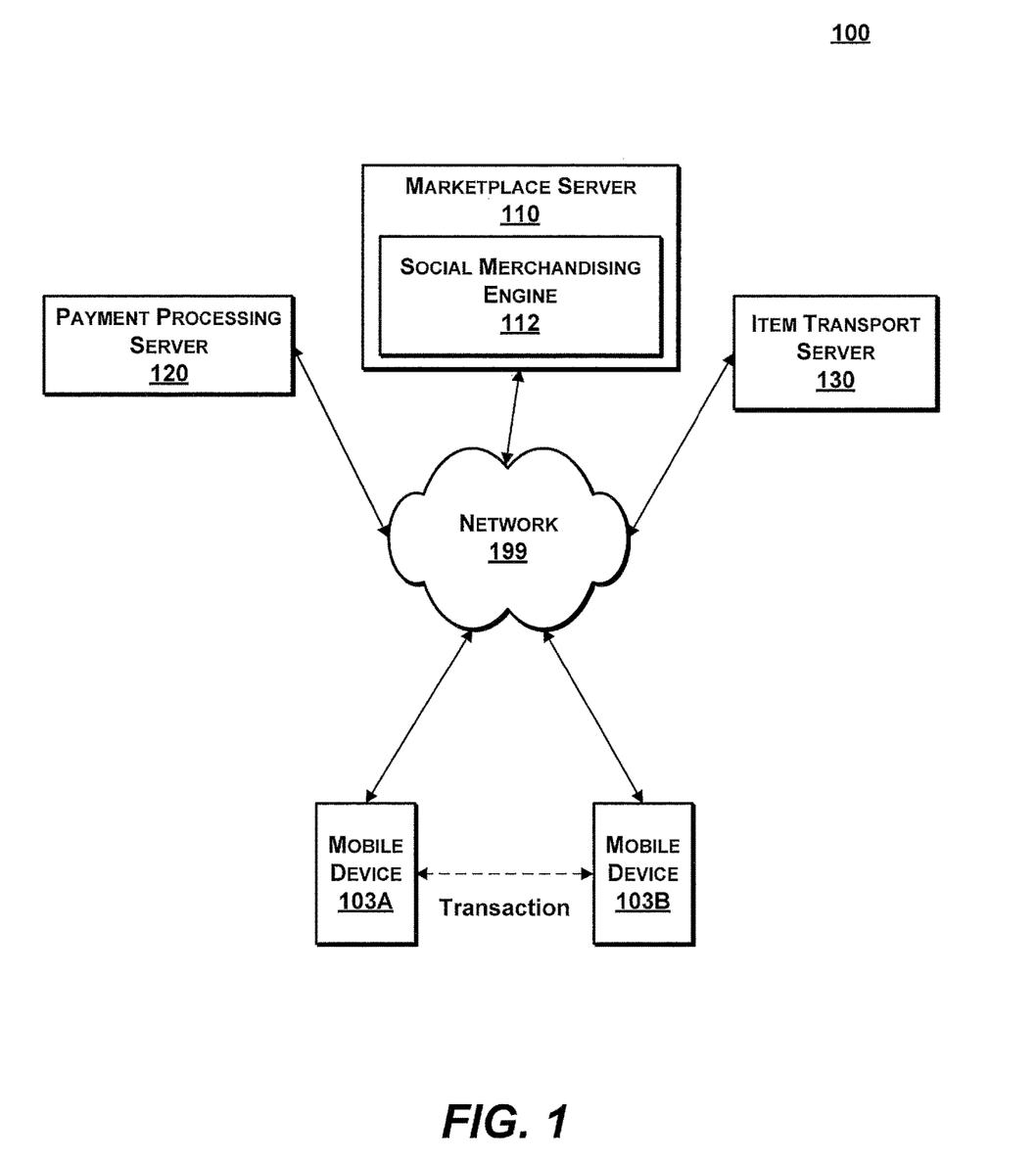
FIG. 1 is a high-level block diagram illustrating a social merchandising system, according to one embodiment of the present invention.
Figure 2:
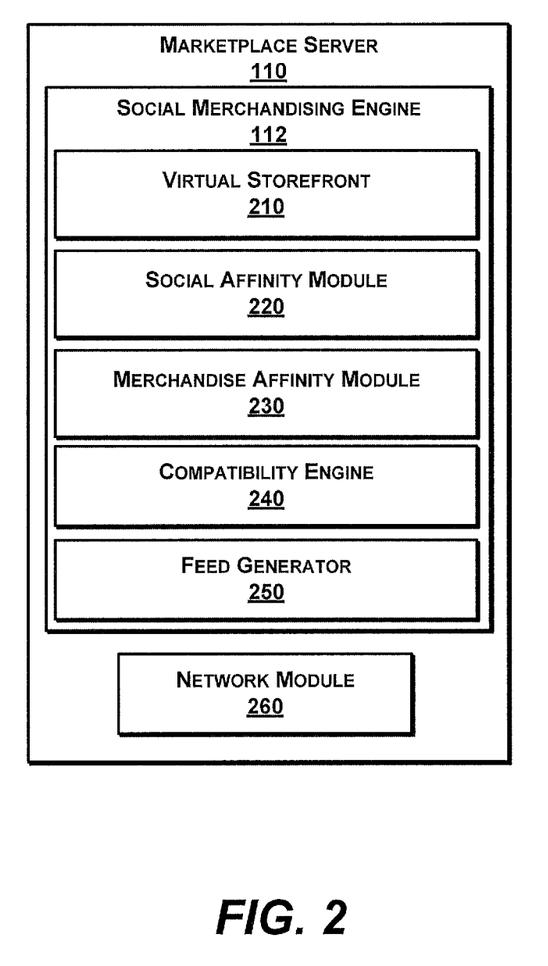
FIG. 2 is a more detailed block diagram of a marketplace server of FIG. 1, according to one embodiment of the present invention.

Systems for Social Merchandising (FIGS. 1-3)

FIG. 1 is a block diagram illustrating an exemplary network architecture in which a social merchandising system 100 can be implemented. The illustrated network architecture comprises multiple mobile devices 103A, 103B, connected to a network 199 which is also connected to a marketplace server 110, a payment processing server 120 and an item transport server 130.

Figure 4:
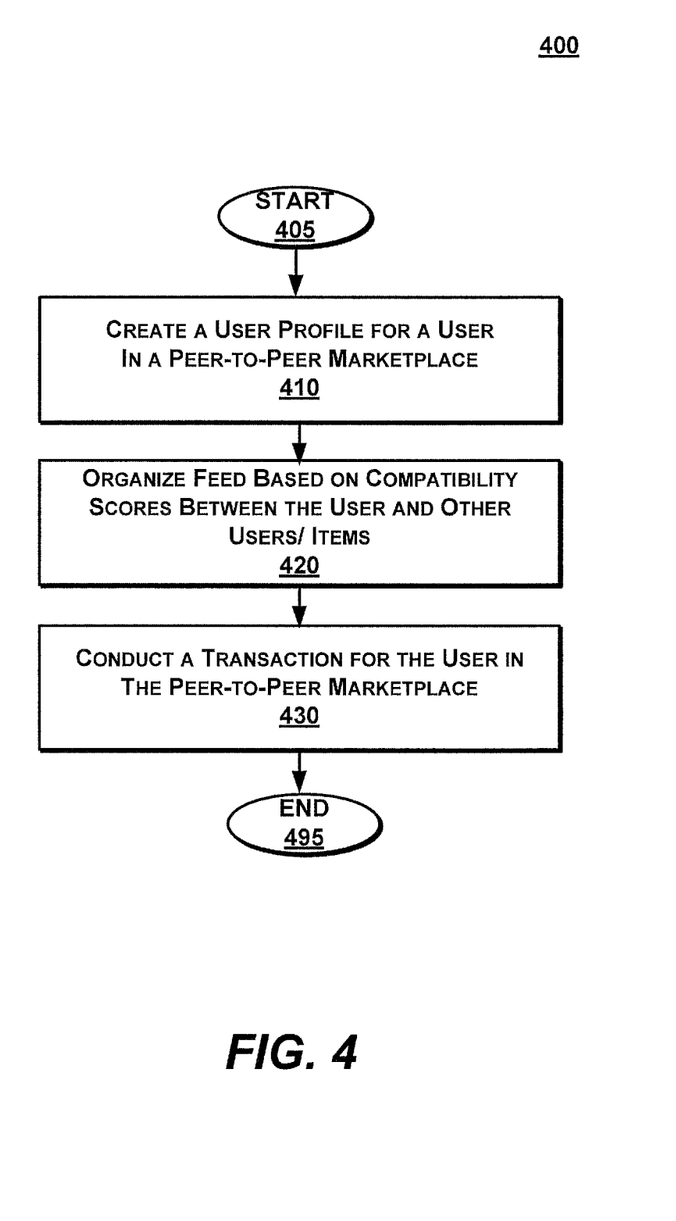
FIG. 4 is a high-level flow diagram illustrating a method for social merchandising, according to one embodiment of the present invention.

The marketplace server 110 comprises a social merchandising engine 112. It is understood that the marketplace server 110 is implementable in a server blade, desktop or mobile PC, a virtual application server, or any suitable processor-based environment. In one aspect, the marketplace server 110 hosts peer-to-peer shopping galleries, shopping parties, virtual storefronts, custom showrooms, and the like. Buyers and sellers can log on to the marketplace server 110 to conduct transactions for various items and services. The marketplace server 110 uses back-end resources, including the payment processing server 120 and the item transport server 130, to execute the transaction and for delivery.

In another aspect, the marketing server 110 provides a custom feed of merchandise for each user in the peer-to-peer marketplace. The feed is populated with compatible items deemed to be of interest by taking into consideration various characteristics of users, social connections of the user, various characteristics of available items, and time. For example, each user profile can be evaluated to determine consumer genomes, producer genomes, and social genomes. Compatibility between a specific user and items for the feed can be evaluated by quantifying and matching social affinities and item affinities. Additional embodiments of the marketplace server 110 (i.e., FIG. 2) and its operations (e.g., FIG. 4) are described in more detail below.

In general, peer-to-peer marketplaces enable the buying and selling of products between various users. Such marketplaces can be general, limited to clothes or books, involve bidding in auctions, or any collection of merchandise. The users can be individuals, small businesses or even large businesses. In a peer-to-peer marketplace, any user can choose to sell or buy from the marketplace, and can often play both roles. Galleries and custom showrooms are configured with physical products, digital products, and services. Peer to peer marketplaces are structured with a variety of approaches and choices to each consumer for payment, pricing and shipping. It may allow the seller to ship using a variety of shipping services, such as the US Postal Service, UPS or FedEx. Finally the money is typically directly paid to the seller by the buyer.

The mobile devices 103 can be implemented in any of the devices set forth for the marketplace server 110. For example, a smart phone, tablet device or laptop computer, executing a mobile browser or a downloaded app can access the marketplace server 110 over an IP or a 4G communication channel. The mobile devices 103 display a user interface, allowing users to directly interface with the marketplace server 110.

The payment processing server 120 can be implemented in any of the devices set forth above. Available payment mechanisms on the payment processing server 120 can be credit or debit cards, electronic checks, electronic coupons or gift cards, wire transfers, or any other financial transactions across networks in support of transactions on the marketplace server 110. The payment processing server 120 can be any payment processing service whether or not actually connected to an ACH (Automated Clearing House) backbone. Exemplary payment processing services can be any suitable service such as those provided by PayPal, Amazon Payments, online Visa, Master Card and American Express services, Western Union, QuickBooks, Google Checkout, and the like. The payment processing server 120 operating on the back-end of the network architecture can be invisible to a buyer and seller who preferably interact with a single user interface of the marketplace server 110.

The item transport server 130 is also implementable in any of the devices described above. The item transport server 130 can be in communication with one or more external transport system databases, managed by entities such as the US Postal Service, UPS, Federal Express, DHL, PO box providers, and the like. The item transport server 120 can use RFID tags, scanners, satellite networks, and other resources to track an item from when the label is printed by a seller until delivered and accepted by a buyer. Intermittent statuses are variable, and can include data such as location, date, time, expected arrival times, actual arrival times, and more.

In general, mobile devices 103 and servers 110, 120, 130 can be implemented using computer systems 600 such as the one illustrated in FIG. 6 and described below. The mobile devices 103 and servers 110, 120, 130 are communicatively coupled to the network 199, for example via a network interface such as a WiFi card and/or software. Mobile devices 103 are able to access applications and/or data on servers 110, 120, 130 using, for example, a web browser or other client software (not shown).

In a more general sense, functionalities of components described herein can be distributed between multiple computer systems, including within a cloud-based computing environment in which the functionality in question is provided as a service over a network. It is to be understood that although the mobile device app and the social merchandising system 100 are illustrated in FIG. 1 as single entities, these components represent collections of functionalities, which can be instantiated as single or multiple modules as desired. It is to be understood that the modules of the mobile device app and of the social merchandising system 100 can be instantiated (for example as object code or executable images) within the system memory (e.g., RAM, ROM, flash memory) of any computer system, such that when the processor of the computer system processes a module, the computer system executes the associated functionality. As used herein, the terms "computer system," "computer," "client," "client computer," "server," "server computer" "mobile communication device" and "computing device" mean one or more computers configured and/or programmed to execute the described functionality. Additionally, program code to implement the functionalities of the social merchandising system 100 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

In one embodiment, a mobile device app is in the form of an iOS app for an iPhone, iPad, iPod touch or other similar mobile device. In other embodiments, a mobile device app can be in the form an app written for a different mobile operating system, such as Android, Windows Phone, Blackberry OS, etc. Clients in the form of laptops or desktops can run applications written for their corresponding operating systems (e.g., Windows, Mac OS, Linux, etc.).

FIG. 2 is a more detailed block diagram of a marketplace server 110 of FIG. 1, according to one embodiment of the present invention. The marketplace server 110 includes the social merchandising engine 112 which in turn consists of a virtual storefront 210, a social affinity module 220, and a merchandise affinity module 230, a compatibility engine 240, and a feed generator 250. Different configurations are possible. These components can be implemented in hardware, software (e.g., as stored on a non-transitory computer readable medium), or a combination of both. In various embodiments, the functionalities can be grouped into different components, or be distributed across various computing devices.

The virtual storefront 210 can be a digital gallery of products made available for peers who can be buyers and sellers, or vice versa. Items are made available to all buyers, in a specific showroom, or to an individual group or user. An item is selected and moved to a shopping cart as a cache of intended purchases. The virtual storefront 210 can provide a checkout at which point delivery information and financial information is input to form fields. A transaction number (e.g., a unique transaction number) is assigned for tracking the transaction. A history of transactions and item details from transactions are stored in a database (not pictured) in association with a user profile.

The social affinity module 220 ranks and matches a specific user, a group of users, a type of user, or the like, to others using compatibility scores determined by algorithms of the compatibility engine 240. As a result, item recommendations for one user are based on other users with similar social characteristics, or are based on other users having a social connection. Also, friend recommendations are made based on social affinities (e.g., as shown in user interface 300 of FIG. 3A). For example, users in close proximity are more likely to conduct a transaction and can avoid shipping. Users having common hobbies or habits may also share certain shopping habits. Another example pairs uses based on items in their virtual closets. The closets include clothes and shoes of a certain size. Thus, users of similar sizes could have an interest in purchasing clothes from each other. Additional social matching factors that are unrelated to merchandising are also possible (e.g., friends of other social networks, e-mail or telephone contacts, and the like).

In one embodiment, compatibility scores for the social affinity module 220 are calculated by the compatibility engine 240 when determining social affinity by grouping scores of characteristics (or genes) into aggregate scores for categories (or genomes). Although many different types of genomes can be implemented, a producer genome, a consumer genome, and a social genome are used for the purpose of illustration herein. Matching can be based on a minimum threshold of compatibility score, or can be based on a predefined number having the highest relative compatibility. Various ranking algorithms described below can be used to rank the affinity of one user to another user, group of users, or type of user.

The merchandise affinity module 230 matches and ranks items also using compatibility scores determined by algorithms of the compatibility engine 240. In response, the feed generator 250 of items are generated for a specific user, a group of users, a type of user, a virtual party, or the like. Feeds can be combined or independent of social affinity module 220 recommendations or rankings. The compatibility engine 240 is further detailed below.

The feed generator 250 can use one or more of the compatibility scores derived from people affinity, item affinity, graph-based affinity, and currency of listing to determine the selection of items and the order of these items in an individual user's feed. The feed can be generated in real-time, at periodic intervals, once, or many times. The feed can be a static listing (e.g., a user interface for showroom 310 of FIG. 3B), or a dynamic scroll according to when items were posted (e.g., a user interface with a scrolling feed 320 of FIG. 3C). Time is another factor used to organize administrate feeds. As such, newer postings can appear higher in a feed, as well as items that will expire in the near future from auctions or virtual parties, and items that have recently changed status through a price reduction or other update. A newer posting can appear higher than an older posting with a higher compatibility score. Feeds can also be filtered to, for example, users in Chicago, or items under $100.

In some embodiments, item recommendations of the merchandising affinity module 230 are affected by social relationships as determined by the social affinity module 220, and in other embodiments, the two determinations are independent. The compatibility engine 240 can classify each item into a merchandising genome for comparison to consumer genomes of users in order to determine a compatibility score (e.g., item compatibility score, or item affinity score). Genes include, but are not limited to, brand, merchandise category, color, size, price, and value. The score, combined with time, determines an order of items in each user's feed. Feed ordering can also be influenced by paid advertisements.

In still another embodiment, feeds customized for a particular showroom which contain a real-time collection of products are updated as qualifying products are added. The showroom is made available by a producer for any user to follow, or is configured by a consumer seeking a particular type of product. For example, an antiquity collector configures a showroom for furniture manufactured in the early 1900s, and a separate showroom for comic books published in the 1960s. In an additional example, a vendor can maintain a clearance showroom for close out products with heavy discounts. Consumers can search for and select producer-generated showrooms. When a new item fitting the criteria is available, a corresponding showroom feed is updated. The update can be pushed to the showroom feed and the user notified, or pulled from a server when the user next checks the showroom.

A network module 260 includes low-level communication software and/or hardware necessary for communication across a medium, and with resources connected to the medium. For example, the network module 260 can represent packet generators used to packetize application data into packets for transport across a wireless data connection, a WiFi card, APIs, or higher level software commands such as Java commands and specific software commands (e.g., scripts).

The Compatibility Engine 240

In more detail, the compatibility engine 240 executes algorithms against each user having a user profile. A compatibility score (e.g., a social compatibility score, or social affinity score) can be calculated as an aggregate of selected factors. For example, producer genome values of price attractiveness, production quality, and shipping promptness can be derived from genes including average listing price, average time to ship, number of items listed, and listing price to original price ratio. In another example, consumer genome categorization as frequent buyer or ratings for satisfiability, for instance, are based on characteristics such as order frequency, return rate, support request, and likes. In a final example, social genome findings of social and helpful are derived from quantifiable genes having values for a number of followers, number following, number of other user's items promoted, number of tags of user in other user's items, and recent educational comments.

Figure 3A:
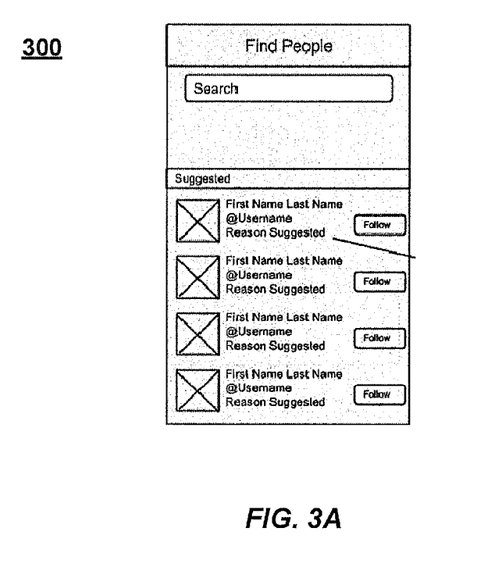
FIGS. 3A-3C are schematic diagrams illustrating wire frames for a user interface in the system of FIG. 1, according to some embodiments of the present invention.
Figure 3B:
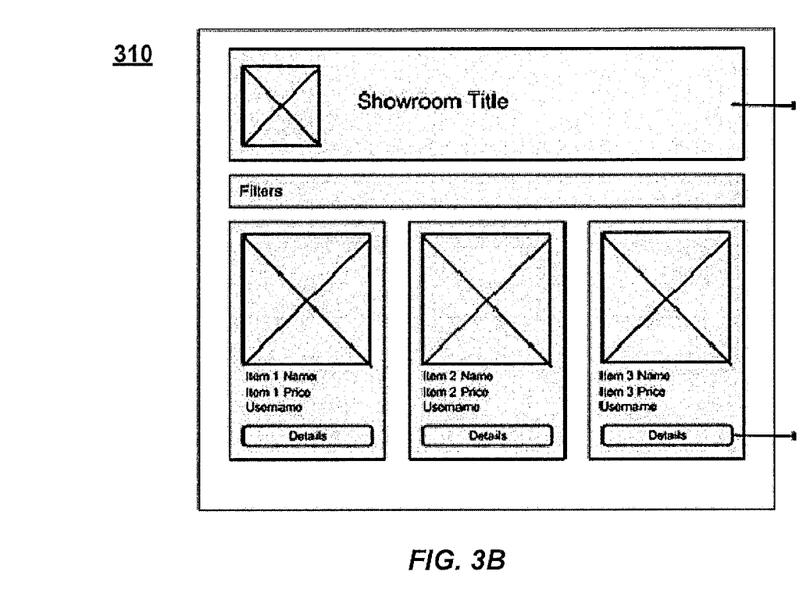
Figure 3C:
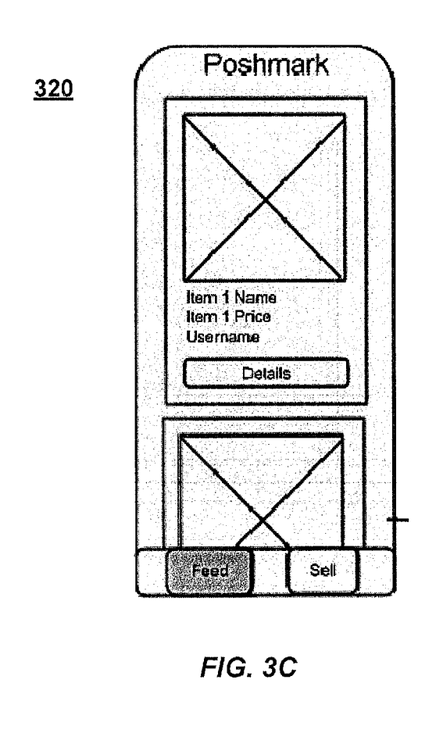
Figure 3D:
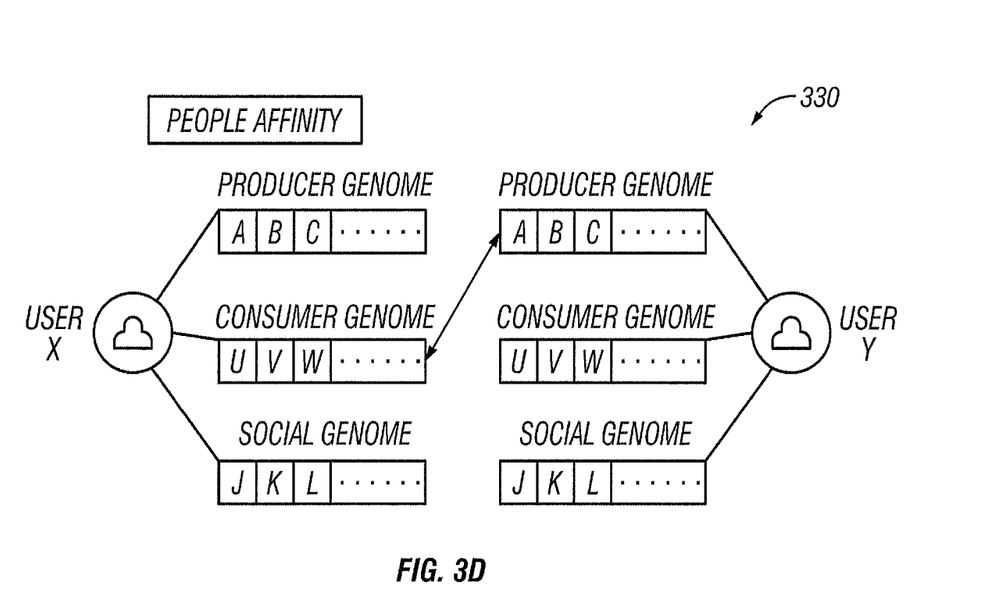
FIGS. 3D-3E are schematic diagrams illustrating genome affinities, according to some embodiments of the present invention.
Figure 3E:
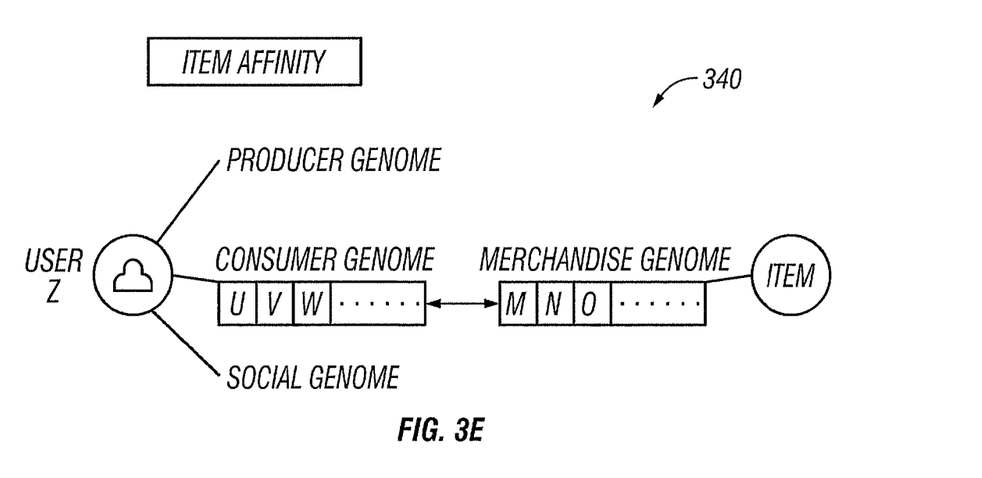

Consumers are matched to items and vice versa (as shown in graph 330 of FIG. 3D). Consumers are matched with producers (as shown in graph 340 of FIG. 3E). In other embodiments, consumers are matched to other consumers as influencers. Each user is described with an n-value consumer genome chart that specifies the attribute affinity of the user. These affinities are then correlated with an n-valued producer genome chart. The producer and consumer genome chart can but need not be the same for a single user. A compatibility score in this case is computed by quantifying the range of difference between the corresponding genome values. To give a positive affinity score, a quantified range of difference can be subtracted from a constant such as 100. The specific format used for affinity scores can vary between embodiments. Each affinity score can be added to create a compound compatibility score. The score is then used to rank each item in the system. When combined with time, the score can become the secondary attribute used to order the items in a given feed.

In still another embodiment, graph-based affinity can be established by the compatibility engine 240 through a user's following graph as well as any social action performed in the system which include likes, comments, shares, and purchases. As a user builds her following base, the system recommends items based on these actions. For example, if User A likes User B's items, and User B likes User C's items, the system can in turn recommend User C's items to User A.

The compatibility engine 240 can create a normalized definition of the merchandising genome of various users which can evolve as the system learns about the platform and users. Each user's consumer and producer genome can be dynamic. The system can evolve these genomes as more information is gathered concerning a user's activities, closet, and preferences. For example, if the compatibility engine 240 learns that a user is increasingly interacting with items of a certain brand, the system can evolve her consumer genome to reflect this information. In this way, the compatibility engine 240 can follow an iterative development of affinities and continue to recommend relevant items and compatible users. This allows the social merchandising system 100, in response, to make targeted recommendations to a user that help her to grow her network in a desirable way, as well as to automatically personalize her main and party feeds over time.

With time, the system identifies new ways to connect people of high compatibility to each other and also new ways to connect relevant items to people. The system can apply machine learning and data mining to evolve and improve the system over time.

Match functions can be learned and improved by adjusting the weights given to the different genes when applied to the matching algorithms between two genomes. For example, where weights $w_1 \ldots w_n$ represent the original set of weights used while matching a producer genome to a consumer genome, the system would iteratively learn a new set of weights Applying the new set of weights to the match function will then result in a higher number of transactions between matched users.

New ways to match users to other users and items can also be identified by mining existing data in order to discover new genes that can be used to grow the genome. For example, the system could learn over time that users who attend the same type of virtual shopping parties have similar tastes and are likely to buy and sell from each other. The system would then start feeding this characteristic into the producer and consumer genomes. Where the old genome is represented by $g_1 \ldots g_n$, the system essentially identifies a new gene $g_{n+1}$ which when applied with appropriate weight in the match function results in a higher number of transactions between matched users.

The application of these learning functionalities can improve specific business metrics, $k_1 \ldots k_i$, such as sales per user, orders (buys) per user, products listed per user, and various activation rates, where activation implies performing a particular action for the first time (e.g., seller activation, product listing activation, buyer activation, etc.). Let f represent the matching function, and $g_{p*}$ and $g_{c*}$ the producer and consumer genes respectively. At time $t_1$, $f(w_1 (g_{p1}, g_{c1}), \ldots w_n (g_{pn}, g_{cn}))$ results in business metrics $[k_1, \ldots k_i]$. Over time the system learns and adjust weights to $w_1 \ldots w_n$, and discovers a new gene $g_{n+1}$. At time $t_2$, $f(w_1 (g_{p1}, g_{c1}), \ldots w_{n'} (g_{pn}, g_{cn}), w_{n'} (g_{pn+1}, g_{cn+1}))$ results in business metrics $[k_1', \ldots k_i']$ which represent a better business outcome than the original set of metrics.

Figure 5:
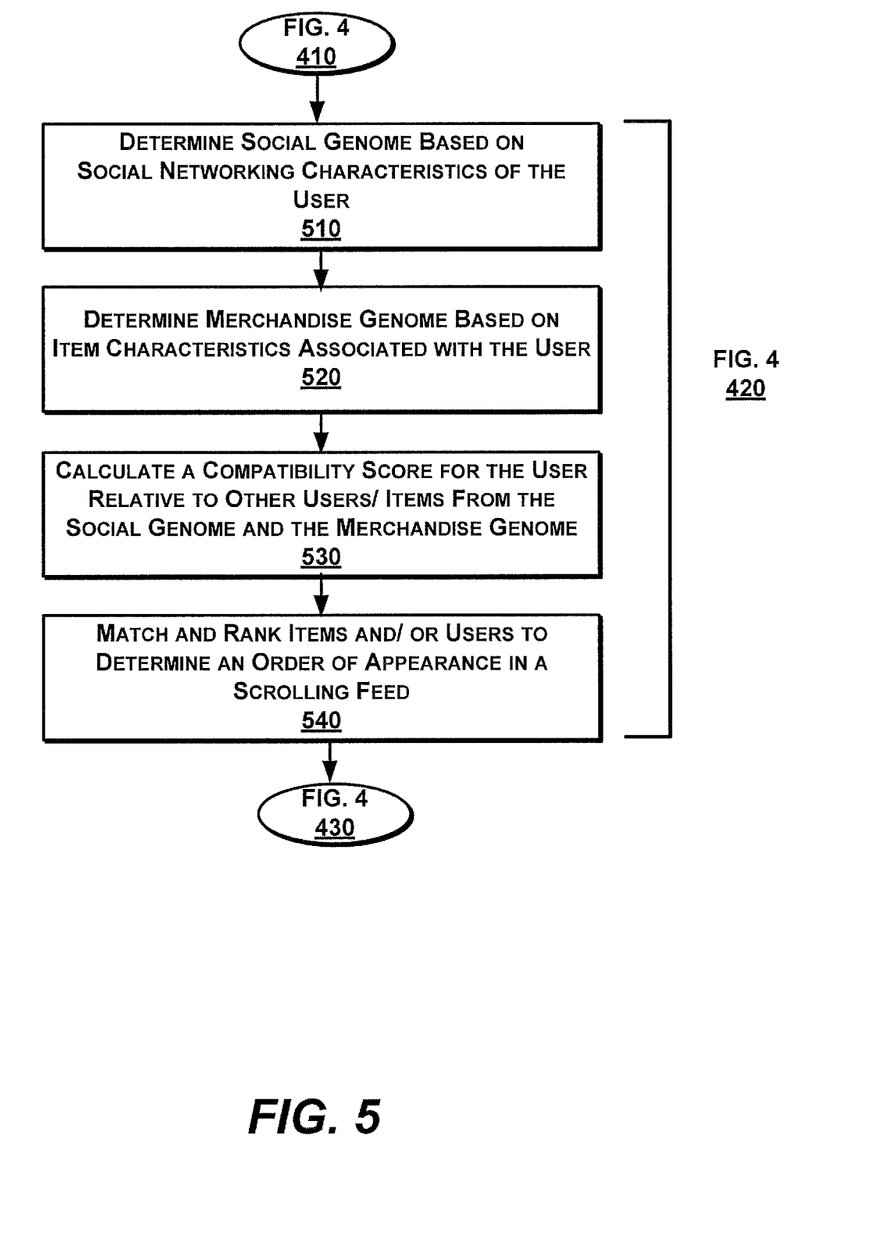
FIG. 5 is a more detailed flow diagram illustrating a step of organizing items into a feed for the user based on a compatibility score between the user and other users and/or items, according to one embodiment of the invention.

Methods for Social Merchandising (FIGS. 4-5)

FIG. 4 is a high-level flow diagram illustrating a method 400 for social merchandising, according to one embodiment of the present invention. The method 400 can be implemented in, for example, the social merchandising system 100, of FIG. 1.

At step 410, a user profile is created for a user in a peer-to-peer marketplace (e.g., by the mobile device 103). At step 420, items are organized into a feed for the user based on a compatibility score between the user and other users and/or items (e.g., by the social merchandising engine 112). At step 430, the user purchases an item in the peer-to-peer marketplace (e.g., by the mobile device 103).

FIG. 5 is a more detailed flow diagram illustrating the step 420 of organizing items into a feed for the user based on a compatibility score between the user and other users and/or items, according to one embodiment of the invention.

At step 510, a social genome is determined based on social networking characteristics associated with the user (e.g., by the social affinity module 220). At step 520, a merchandising genome is determined based on item characteristics associated with the user (e.g., by the merchandising affinity module 230). At step 530, a compatibility score is calculated for the user relative to users/items from the social genome and the merchandising genome (e.g., by the compatibility engine 240). At step 540, items and/or users are matched and ranked to determine an order of appearance in a scrolling manner (e.g., by the feed generator 250). Results can be sent to the mobile device 103 for display to the user.

Figure 6:
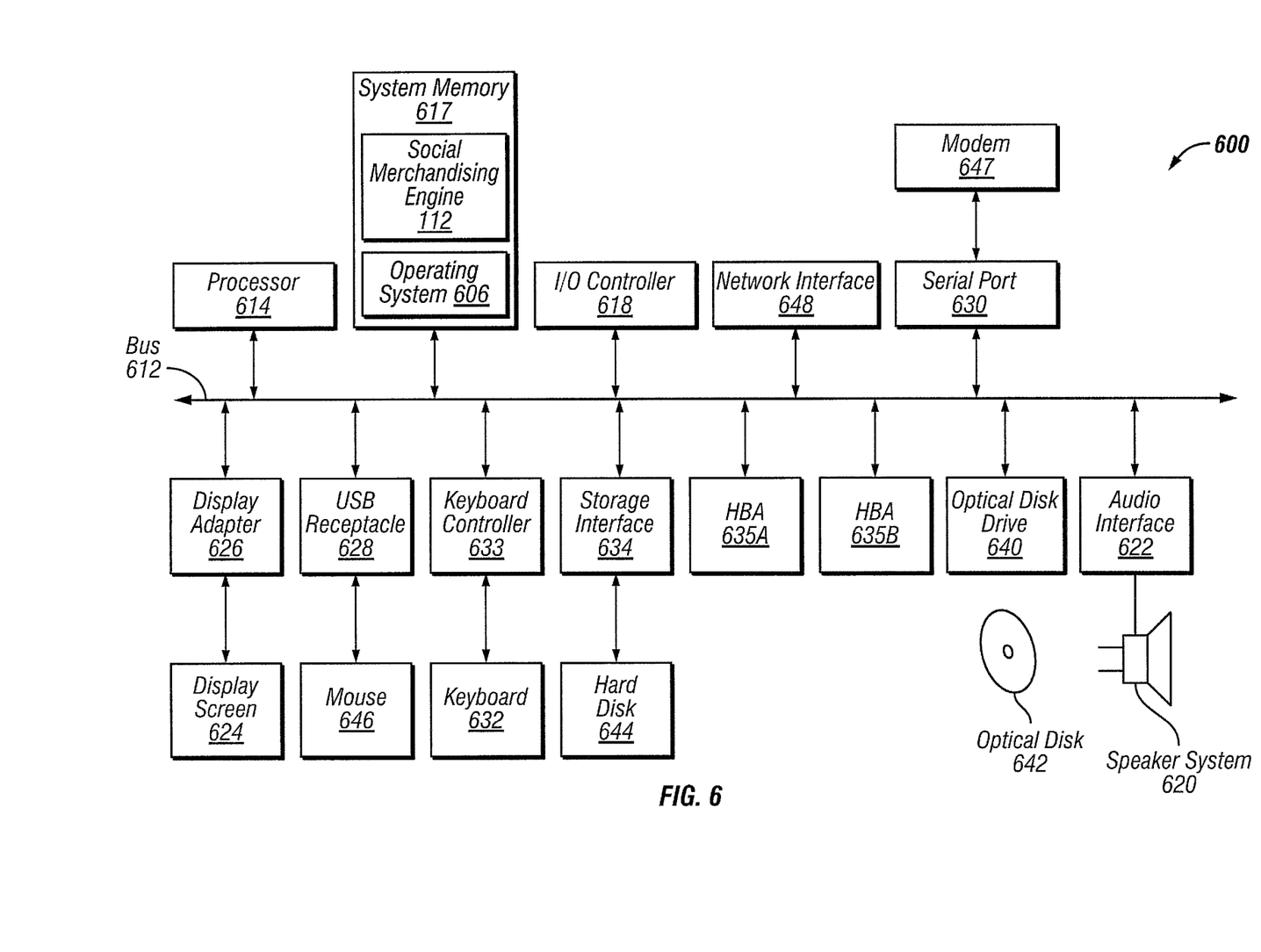
FIG. 6 is a block diagram illustrating a general computing system suitable for components described herein, according to one embodiment of the present invention The Figures depict various embodiments for purposes of illustration only. One skilled in the art will readily recognize from the following discussion that other embodiments of the structures and methods illustrated herein may be employed without departing from the described principles.

Generalities of the Disclosure (FIG. 6)

FIG. 6 is a block diagram of a computer system suitable for implementing the social merchandising system 100 and its components. Mobile computing devices, other client computers, and servers can be implemented in the form of such computer systems. As illustrated in FIG. 6, the bus 612 communicatively couples other components of the computer system, such as at least one processor 604, system memory 617 (e.g., random access memory (RAM), read-only memory (ROM), flash memory), an input/output (I/O) controller 618, an audio output interface 622 communicatively coupled to an external audio device such as a speaker system 620, a display adapter 626 communicatively coupled to an external video output device such as a display screen 624, one or more interfaces such as serial ports 630, Universal Serial Bus (USB) receptacles 630, parallel ports (not illustrated), etc., a keyboard controller 633 communicatively coupled to a keyboard 632, a storage interface 634 communicatively coupled to at least one hard disk 644 (or other form(s) of magnetic media), an optical disk drive 640 configured to receive an optical disk 642, a mouse 646 (or other pointing device) coupled to the bus 612 e.g., via a USB receptacle 628, a modem 647 coupled to bus 612, e.g., via a serial port 630, and a network interface 248 coupled, e.g., directly to bus 612.

Other components (not illustrated) may be connected in a similar manner (e.g., document scanners, digital cameras, printers, etc.). Conversely, all of the components illustrated in FIG. 6 need not be present. The components can be interconnected in different ways from that shown in FIG. 6.

The bus 612 allows data communication between the processor 604 and system memory 617, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 644, optical disk 642) and loaded into system memory 617 and executed by the processor 604. Application programs can also be loaded into system memory 617 from a remote location (i.e., a remotely located computer system), for example via the network interface 648 or modem 647. In FIG. 6, the social merchandising engine 112 is illustrated as residing in system memory 617. An operating system (OS) 606 is also depicted as residing in the system memory 617. A mobile device app can also reside in the system memory 617 of a computer system.

The storage interface 634 is coupled to one or more hard disks 644 (and/or other standard storage media). The hard disk(s) 644 may be a part of the computer system, or may be physically separate and accessed through other interface systems.

The network interface 648 and or modem 647 can be directly or indirectly communicatively coupled to a network such as the Internet. Such coupling can be wired or wireless.

As will be understood by those familiar with the art, the subject matter described herein may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the subject matter or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

We claim:

1. A computer-implemented method, in a merchandising server, for matching users in a peer-to-peer marketplace over a communication system, the method comprising the steps of:

creating a user profile for a user among a plurality of users in the peer-to-peer marketplace, wherein at least some of the plurality of users are both buyers and sellers of items available in the peer-to-peer marketplace;

identifying social network characteristics associated with the user, wherein the social networking characteristics comprise users followed by the user or friends, and interactions between the user and the followed users or friends;

determining networking scores that represent the social networking characteristics, each network score being assigned an adjustable weight factor;

determining a social set of scores for the user based on grouping the social networking scores representing social networking characteristics associated with the user, by a computer;

identifying item characteristics associated with the user, the item characteristics being identified on a digital showcase of items available from the user;

determining item scores that represent the item characteristics;

determining a merchandise set of scores for the user based on grouping the item scores representing item characteristics associated with the user, by a computer;

updating one of the weight factors of the networking scores for the user responsive to identifying new social networking characteristics;

calculating by a computer, a compatibility score for the user to at least one of the plurality of users based on both the social set of scores comprising the updated one of the weight factors of the networking scores and the merchandise set of scores of the user relative to both the social set of scores and the merchandise set of scores of the at least one of the plurality of users;

determining an affinity between users that are both buyers and sellers using the compatibility score, the affinity comprising ranking the users that are both buyers and sellers;

making one or more friend recommendations to the user from the plurality of users based on the compatibility score and the affinity;

receiving at least one friend selection from the one or more friend recommendations;

generating a dynamic feed for the user based on the compatibility score updated according to the at least one friend selection, the dynamic feed comprising one or more selectable links that can be selected to display additional information about items associated with the one or more selectable links, the one or more selectable links being selected and organized in real-time based on the compatibility score for the user;

sending the dynamic feed to a computer device of the user for display, wherein the dynamic feed is presented to the user in an interface on a display of the computer device; and receiving a selection of the one or more selectable links included in the dynamic feed and causing the computing device of the user to display additional information about the items associated with the selection.

2. The method of claim 1, generating the dynamic feed for the user comprises:
ranking the plurality of users based on the compatibility score; and
ordering the dynamic feed according to the ranking.

3. The method of claim 1, wherein organizing items into the dynamic feed for the user comprises:
ranking items associated with friends of the user based on compatibility scores, wherein the friends of the user comprise other users associated with the user; and
ordering the dynamic feed at least in part according to the ranking.

4. The method of claim 1, further comprising:
configuring one or more individual showrooms for the user; and
organizing separate feeds for each individual showroom.

5. The method of claim 1, further comprising:
determining a consumer set of scores for the user based on consumer scores representing buying characteristics of the user in the peer-to-peer marketplace; and
calculating a compatibility score for the user to at least one other user based on an affinity of the consumer set of scores of the user to a producer set of scores of the at least one other user.

6. The method of claim 1, further comprising:
determining a producer set of scores for the user based on producer scores representing selling characteristics of the user in the peer-to-peer marketplace; and
calculating a compatibility score for the user to at least one other user based on an affinity of the producer set of scores of the user to a consumer set of scores of the at least one other user.

7. The method of claim 6, further comprising:
wherein the producer set of scores is categorized according to one or more of price attractiveness, production quality, and shipping promptness, and
wherein the selling characteristics of the user in the peer to peer marketplace comprise average listing price, average time to ship, number of items listed, and list price to original price ratio.

8. The method of claim 5 further comprising:
wherein the consumer set of scores is categorized according to or more of order frequency, satisfiability, size, and brand preference, and
wherein the buying characteristics of the user in the peer to peer marketplace comprise number of orders, amount spent, return rate, support requests, and likes of items.

9. The method of claim 5, further comprising:
wherein the consumer set of scores is categorized according to one or more of social rating and helpfulness, and
wherein the buying characteristics of the user in the peer to peer marketplace comprise number of followers, number following, number of other user's items promoted, tagging of users in other user's items, and educational comments.

10. The method of claim 1, wherein the dynamic feed comprises dynamic content that changes relevance with time, wherein time is relative to at least one of a posting time, an ending time, and a change of status time.

11. A non-transitory computer-readable medium storing computer executable instructions that, when loaded into computer memory and executed by at least one processor of a computing device, cause the computing device to perform a method in an order state server, for matching users in a peer-to-peer marketplace over a communication system, the method comprising the steps of:

creating a user profile for a user among a plurality of users in the peer-to-peer marketplace, wherein at least some of the plurality of users are both buyers and sellers of items available in the peer-to-peer marketplace;

identifying social network characteristics associated with the user, wherein the social networking characteristics comprise users followed by the user or friends, and interactions between the user and the followed users or friends;

determining networking scores that represent the social networking characteristics, each network score being assigned an adjustable weight factor;

determining a social set of scores for the user based on grouping the social networking scores representing social networking characteristics associated with the user, by a computer;

identifying item characteristics associated with the user, the item characteristics being identified on a digital showcase of items available from the user;

determining item scores that represent the item characteristics;

determining a merchandise set of scores for the user based on grouping the item scores representing item characteristics associated with the user, by a computer;

updating one of the weight factors of the networking scores for the user responsive to identifying new social networking characteristics;

calculating a compatibility score for the user to at least one of the plurality of users based on both the social set of scores comprising the updated one of the weight factors of the networking scores and the merchandise set of scores of the user relative to both the social set of scores and the merchandise set of scores of the at least one of the plurality of users;

determining an affinity between users that are both buyers and sellers using the compatibility score, the affinity comprising ranking the users that are both buyers and sellers;

making one or more friend recommendations to the user from the plurality of users based on the compatibility score and the affinity;

receiving at least one friend selection from the one or more friend recommendations;

generating a dynamic feed for the user based on the compatibility score updated according to the at least one friend selection, the dynamic feed comprising one or more selectable links that can be selected to display additional information about items associated with the one or more selectable links, the one or more selectable links selected and organized in real-time based on the compatibility score for the user;

sending the dynamic feed to a computer device of the user for display, wherein the dynamic feed is presented to the user in an interface on a display of the computer device; and receiving a selection of the one or more selectable links included in the dynamic feed and causing the computing device of the user to display additional information about the item associated with the selection.

12. The computer-readable medium of claim 11, wherein in the method, generating the dynamic feed for the user comprises:
ranking the plurality of users based on the compatibility score; and
ordering the dynamic feed according to the ranking.

13. The computer-readable medium of claim 11, wherein in the method, organizing items into the dynamic feed for the user comprises:
ranking items associated with friends of the user based on compatibility scores; and
ordering the dynamic feed at least in part according to the ranking.

14. The computer-readable medium of claim 11, wherein the method further comprises:
configuring one or more individual showrooms for the user; and
organizing separate feeds for each individual showroom.

15. The computer-readable medium of claim 11, wherein the method further comprises:
determining a consumer set of scores for the user based on consumer scores representing buying characteristics of the user in the peer-to-peer marketplace; and
calculating a compatibility score for the user to at least one other user based on an affinity of the consumer set of scores of the user to a producer set of scores of the at least one other user.

16. The computer-readable medium of claim 11, wherein the method further comprises:
determining a producer set of scores for the user based on producer scores representing selling characteristics of the user in the peer-to-peer marketplace; and
calculating a compatibility score for the user to at least one other user based on an affinity of the producer set of scores of the user to a consumer set of scores of the at least one other user.

17. The computer-readable medium of claim 16, wherein the method further comprises:
wherein the producer set of scores is categorized according to one or more of price attractiveness, production quality, and shipping promptness, and
wherein the selling characteristics of the user in the peer to peer marketplace comprise average listing price, average time to ship, number of items listed, and list price to original price ratio.

18. The computer-readable medium of claim 15, wherein the method further comprises:
wherein the consumer set of scores is categorized according to or more of order frequency, satisfiability, size, and brand preference, and
wherein the buying characteristics of the user in the peer to peer marketplace comprise number of orders, amount spent, return rate, support requests, and likes of items.

19. The computer-readable medium of claim 15, wherein the method further comprises:
wherein the consumer set of scores is categorized according to or more of social rating and helpfulness, and
wherein the buying characteristics of the user in the peer to peer marketplace comprise number of followers, number following, number of other user's items promoted, tagging of users in other user's items, and educational comments.

20. A social merchandising server to match users in a peer-to-peer marketplace over a communication system, the social merchandising server comprising:
a processor; and
a memory, storing:
a first component to create a user profile for a user among a plurality of users in the peer-to-peer marketplace, wherein at least some of the plurality of users are both buyers and sellers of items available in the peer-to-peer marketplace;
a second component to identify social network characteristics associated with the user, wherein the social network characteristics comprise users followed by the user or friends, and interactions between the user and the followed user or friends, determine social networking scores that represent the social networking characteristics, each social network score being assigned an adjustable weight factor, determine a social set of scores for the user based on grouping the social networking scores representing the social networking characteristics associated with the user, and update one of the weight factors of the social networking scores for the user responsive to identifying new social networking characteristics;
a third component to identify item characteristics associated with the user, the item characteristics being identified on a digital showcase of items available from the user, determine item scores that represent the item characteristics, and determine a merchandise set of scores for the user based on grouping the item scores representing item characteristics associated with the user, by a computer;
a fourth component to calculate a compatibility score for the user to at least one of the plurality of users based on both the social set of scores comprising the updated one of the weight factors of the networking scores and the merchandise set of scores of the at least one of the plurality of users and determine an affinity between users that are both buyers and sellers using the compatibility score, the affinity comprising ranking the users that are both buyers and sellers;
a fifth component to make one or more friend recommendations to the user from the plurality of users based on the compatibility score;
a sixth component to receive at least one friend selection from the one or more friend recommendations a seventh component to generate a dynamic feed for the user based on the compatibility score updated according to the at least one friend selection, the dynamic feed comprising one or more selectable links that can be selected to display additional information about items associated with the one or more selectable links, the one or more selectable links selected and organized in real-time based on the compatibility score for the user; and
an eighth component to send the dynamic feed to a computer device of the user for display, wherein the dynamic feed is presented to the user in an interface on a display of the computer device and the eight component is further configured to receive a selection of the one or more selectable links included in the dynamic feed and causing the computing device of the user to display additional information about the item associated with the selection.

* * * * *